Patented Oct. 17, 1944

2,360,716

UNITED STATES PATENT OFFICE 2,360,716

ARC WELDING MATERIAL

Vladimir Peters, Lakewood, Ohio, assignor to The Lincoln Electric Company, Cleveland, Ohio, a corporation of Ohio No Drawing. Application August 5, 1942, Serial No. 453,684

3 Claims. (Cl. 148—26)

This invention relates as indicated to an improved material for use in arc welding and more particularly a material or so-called flux designed to be placed on the workpiece along the line to be welded. Still more particularly the invention relates to an improved material or composition of matter for use in so-called deep flux welding wherein a relatively thick or heavy layer of such flux is employed.

In electric arc welding the metal in the pool which after solidification forms the weld, is raised to a very high temperature. Roughly, the temperature of the arc can be expressed as the boiling point of the metal being welded. Such high temperature will cause deterioration of the weld metal unless some means is used to guard against it. This deterioration may be due to a number of causes such as an oxidation of the weld metal, absorption by the weld metal of gases from the atmosphere with which it comes in contact, and more frequently contamination of the weld metal by substances which occur as foreign materials in the weld area.

It has accordingly been the general practice to first rather carefully prepare the metal surface on which the weld metal pool is to be formed. This was done to eliminate as much as possible all of these foreign materials. As a further step, fluxes have been provided whose primary function has been to clean up the weld metal, that is float to the surface of the pool such oxides and the like as may become dissolved in the weld metal pool during its formation. Another expedient has been to carry on the welding operation in either a neutral or reducing atmosphere provided usually by the combustion of cellulosic materials arranged as a covering on the weld rod or fed laterally thereto in the form of a cord or rope.

The fluxing material above referred to has been introduced in a variety of ways, most generally by being included with the combustible material in a covering adhering to weld rod. In other instances the flux has been deposited on the work ahead of the arc. In all of these expedients however, the arc stream of molten metal, that is the stream of molten metal flowing from the fusible electrode to the work, has not been fully and completely protected, especially when attempts were made to weld at high speeds.

More recently therefore, attention has been directed to the expedient of placing on the work ahead of the arc a layer of material which has a thickness greater than the distance between the work and the electrode so as to mechanically laterally shield the arc stream. All efforts along the line of this latter expedient have thus far been successful only when the work on which the pool of weld metal is deposited has been meticulously cleaned of all foreign materials. In other words, those processes of so-called deep flux bed welding which have relied for success primarily on the fact that the work was sufficiently clean and the flux bed sufficiently inactive so that substantially no chemical reactions might take place and so that such chemical reactions or the products thereof might not contaminate the weld metal. These processes have two primary limitations. First, they are limited to the speed at which the welding operation may be successfully performed. The second and principal limitation is the expense of preparing the work for the welding operation in order that all foreign substances are removed from the welding zone so that they may not under the conditions of the arc cause the reactions to take place which will contaminate the weld metal.

The present invention is based on a different premise. The present invention instead of operating with an entirely neutral or unreactive flux bed on the contrary employs one whose success is dependent upon the occurrence of a substantial amount of chemical reaction, whereas the prior art has first carefully pre-fused the flux comprising the deep bed layer in which the welding operation has been performed. The present invention utilizes an un-fused flux so that all reactions which take place between the components of the flux bed at the welding temperature occur in the arc area. The present invention is therefore an improvement over the prior art in that it is in the first place not necessary to carefully clean the work, and in the second place it is not necessary to resort to the expensive procedure of pre-fusing the flux and then grinding the same before it can be used. All of these factors are supplemented by the further advantage that the present process makes it possible to weld at higher speeds than the processes of the prior art. The foregoing are the principal objects of the present invention. Other objects of the invention will appear as the description proceeds.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

Broadly stated, the present invention comprises the process of electric arc welding of unprepared edges which may have thereon substantial amounts of foreign materials by welding through a layer of material which comprises a component effective under the conditions of the arc to convert into slag the residue of any such foreign material and another component which under the conditions of the arc is effective primarily as a deoxidizer.

In the foregoing broad statement of this invention, reference has been made to "unprepared edges." By this statement it is intended to explain that in using the improved flux of this invention it becomes unnecessary to specially clean or otherwise prepare the edges of the metallic stock to be welded. Likewise, the edges to be welded together may have thereon such amounts of scale and moisture as are sometimes and usually present on commercial steel plates from which welded structures are fabricated.

Throughout this description, and in the claims, reference will be made to the fact that the flux of this invention is unfused. By this statement it is not intended to mean that any of the components of the final mixture may not at one time or another have been fused, either prior to their being taken out of the ground, or during the course of their manufacture before entering into the mere mechanical mixture of the components hereinafter more specifically identified. By the use of the term "un-fused" it is, therefore, intended to explain that the various components which make up the flux need only be mechanically mixed, and that it is not necessary to fuse together such mixture and then regrind it before use, as in the practice with some fluxes used in deep flux bed welding.

Throughout the description, and in the claims, reference will also be had to the fact that the flux of the present invention, and the use of which characterizes the process of this invention, is "placed on the work" ahead of the arc. It should be noted that the flux of this invention may be utilized in a variety of ways. In the simplest form of its use, it is placed in a windrow on the work ahead of the arc. The depth of such windrow is preferably greater than the distance between the end of the electrode and the work. Instead of being thus deposited in the form of a windrow, it is also within the contemplation of this invention to provide automatic feeding means, which is effective in a variety of ways, to introduce the flux into the arc area. One of such ways is to provide a reel from which is unwound a narrow strip of thin material, such as a metal paper, cellophane, etc. This thin strip may be advanced into the arc, and prior to its movement into the actual arc area, it may have deposited thereon a stream of the flux, and if such thin strip is creased in the form of a wide V, it will serve to maintain the stream of deposited flux in the form of a laterally confined windrow which moves into the arc for the purpose of providing a flux layer over the pool of molten metal in the manner hereinafter more fully explained.

While such strip of thin material when utilized in the manner described may not deposit the flux on the work until the latter has actually been melted down by the arc, nevertheless, the term "deposited on the work ahead of the arc" when used herein is to be construed as broadly including all of these various ways of getting the flux into the arc area.

At this point it may also be well to mention that the windrow, or layer of material deposited on the work ahead of the arc in practicing my invention, need not consist entirely of the improved flux. Generally, when the flux layer is of a sufficient thickness so that the end of the welding electrode projects into the layer, only a portion of the flux will be melted down. As explained later, the unmelted portion of the flux may be collected and used over again.

For certain types of welding operations it will be found expedient to first deposit on the work, or strip of thin material, as above explained, a much smaller stream or windrow than that heretofore referred to. By depositing a second stream on top of the first a composite windrow may be produced. Now, if the first stream thus deposited is the flux of the present invention, that windrow need only be large enough to supply the amount of flux which would be normally melted down during the welding operation. The second windrow may be a lowered cost material, such as, for example, a commercial grade of silica sand.

From the foregoing broad statement of this invention, it will be observed that the mixture of materials which comprise the flux provides the materials for two principal and basically different chemical reactions which will take place during the welding operation. It is of course necessary to provide a proper environment in order for these reactions to successfully occur. It is also necessary that there be present on the weld a material which will function to mechanically exclude the atmosphere from both the arc stream and the weld metal pool after the latter is formed so that both the initial and continuing detrimental effect of the atmosphere will be avoided. It is, therefore, expedient to subdivide the components of my improved welding material into three parts which for convenience in identification I shall indicate respectively as (a) the matrix, (b) the oxidizer, and (c) the deoxidizer. The invention may be best understood by having reference to these components separately with an explanation of their composition and function.

*The matrix*

The matrix of the welding material of this invention provides not only the environment or medium within which the reactions entered into by the other components may occur, but also a mechanical medium which, under the conditions of the arc, is fluid and in such state that it mechanically laterally shields the arc stream and the pool of molten metal after deposition.

The matrix provided for the purpose described is principally silica, and is produced by the inclusion in the mixture of substantial quantities of commercial grades of silica sand. It has been found, however, that plain silica sand cannot be used alone as the matrix.

In the first place, silica sand has such a high melting point that with the welding speeds contemplated by this invention the silica sand does not melt down to a fluid pool rapidly enough to provide the fluid matrix in which are carried the other components of the flux.

In the second place, plain silica sand has, after being reduced to the molten state, such a high surface tension, and such a high freezing point, that upon solidification it leaves an undesirably rough bead surface, certain characteristics of which are sometimes referred to as under-cutting. It, therefore, becomes necessary to employ an additional matrix component which, for convenience, will be referred to as the "modifying material."

The modifying material used with the silica sand in providing the matrix may be selected from a wide variety of materials. One such material which has been found quite desirable is cryolite. Inorganic halogen salts are generally useful for this purpose, as are other materials, such as the oxides and silicates of zirconium. It has been found that commercially available Portland cement is effective as a modifier, and particularly when the same is used in partial replacement of the cryolite.

The exact function and mode of operation of these modifier materials is not understood. They do, however, when present, so change the character of the matrix that it not only remains molten at a much lower temperature than straight silica sand, but also has other physical properties which lead to the production of a smooth bead upon solidification of the weld metal. It is believed that these additional properties include a lowering of the surface tension of the molten slag.

As indicated, the precise mode of functioning of these modifier materials is not understood. However, the following is offered as a reasonable explanation of their mode of operation.

If we take cryolite, for example, it is believed that it, on account of its considerably lower melting point than the silica sand, is first reduced to a molten or fluid state. In its fluid state, the molten cryolite acts as a solvent for the silica, and the resulting fluid mass, which comprises the matrix of the slag, is characterized by a lower freezing point than plain molten silica, and by a considerably higher fluidity or, stated in another way, lower surface tension. The silica matrix thus modified, therefore, remains molten for a longer period of time to permit a greater degree of solidification of the weld metal before the slag solidifies, and of equal importance, exists in such a fluid state that it does not, while floating on the molten metal pool, result in depressions or similar irregularities in the pool upon solidification of the latter.

It is known that in the art of producing porcelain enamels, for example, the same are generally principally composed of silica sand. The materials which are added to the silica sand in the production of porcelain enamels are generally for the purpose of lowering the freezing point of the resultant melt and also for the purpose of increasing the fluidity or lowering the surface tension of the melt.

It should, therefore, be expected that any material which is thus added to porcelain enamels for the stated purposes, and which modifying materials, on account of their nature, will not contaminate the weld metal, may be satisfactorily used as the "modifier material" for the matrix of the flux of this invention.

The oxidizer

This component may be any material which under the conditions encountered in the arc will function as an oxidizer. It should be observed that when the term "oxidizer" is used throughout this description and in the claims, it is intended that such term shall include only those materials which function as oxidizers under the conditions encountered in the arc. It will be appreciated that the class of materials included by such definition includes certain materials which do not function as oxidizers at room temperatures, and such class also excludes certain materials which would serve as oxidizers at relatively low temperatures, but which would not thus function under the conditions encountered in the arc.

There are a number of materials available for this purpose. However, in the selection of the oxidizer one must take into account the by-products formed by the use of the material and the effect of such by-product on the weld metal. This invention is primarily concerned with the welding of ferrous metals and at this point it may be well to indicate that the present invention has been found useful in the welding of a wide range of alloy compositions varying all the way from substantially pure iron to alloyed steels. Rimmed steels, killed steels, and all other well-known types and grades of steels may be welded using the flux of this invention. This is one of the particular advances of the present invention, i. e. the same flux composition may be used for a wide variety of parent metal compositions which are to be welded. However, since the invention does contemplate particularly the welding of ferrous metal alloys, the oxidizers which are particularly suitable for use are the oxides of manganese and iron. Both of these yield materials which are also found in the metal being welded and thus the end products of their reaction when they serve as an oxidizer do not contaminate the weld metal. Of the many thus available oxidizers, the oxides of manganese will usually give best results.

As previously indicated the oxides of iron, such as $Fe_2O_3$ may also be used as the oxidizer material. It has been found that the oxides of iron may be used alone as the only oxidizer or in partial substitution for the oxides of manganese. Whether the oxides of iron are used in partial or total substitution for the oxides of manganese, it will usually be found that a smaller amount of the oxides of iron will be required for a specific effect than the oxides of manganese, and thus this must be kept in mind in determining the amount of the particular oxide to be used.

The deoxidizer

This component should be such that the class of materials intended to be included by the term "deoxidizer" as used in this specification and in the appended claims, is intended to include only those materials which are capable of functioning as deoxidizers under the conditions encountered in the arc. Such class therefor excludes a number of materials which are conventionally known as deoxidizers and also includes materials which are not conventionally identified as deoxiziders.

The materials suitable for use as this component of the mixture are the following which are named in the order of their preference for use, viz., Silica manganese
Ferro manganese
Ferro silicon, etc., and combinations of these This component is primarily responsible for the "soundness" of the weld metal. It is recognized that the silica matrix serves as a solvent in which the oxides originally present or produced by the chemical reactions which occur during the welding operation are dissolved and thus prevented from occurring as inclusions in the weld metal, and it is also recognized that the function of the oxidizer is to convert the foreign materials present into such form so that they may be dissolved in the matrix. Nevertheless, the deoxidizer serves as the medium whereby the oxygen liberated from the oxidizer, as well as the oxygen present in the atmosphere in the vicinity of the arc, is prevented from being absorbed by the weld metal. In the compounding of the mixture care must be exercised to insure that there will always be an excess of the deoxidizer present based on the amount of oxidizer which is used. In other words, the deoxidizer must always be present in an amount sufficient to absorb the excess oxygen liberated by the oxidizer and to also protect the weld metal from the oxygen present in the atmosphere.

Here again, a compound of manganese, i. e., silico manganese will generally be found to produce best results and the reasons for this selection are in certain particulars the same as the reasons for the selection of a compound of manganese as the oxidizer. Ferro silicon has certain advantages although it has generally been found to be not as desirable for use as silico manganese.

*Other permissible inclusions*

The foregoing is a definition of the three essential components which make up the mixture of materials which in accordance with my invention are deposited on the work ahead of the arc. It is of course recognized that for special usages and in connection with special welding operations on particular alloys, it will be found desirable to modify the material composition by the addition thereto of other components. This is entirely feasible since the basic essential components of the mixture are such as to make possible the use of other constituents usually used in arc welding fluxes for their normal function. In addition it should be noted that the raw materials i. e., the commercial form in which the named basic components are usually available generally have combined therewith other substances. For example, iron oxide, aluminum oxide and other substances may be found as impurities in the raw materials which are usually utilized to yield the named basic components. The materials used in the manufacture of my improved flux may all be the commercial grade containing the usual impurities.

*Specific examples*

In addition to the foregoing description of my invention it will be helpful for a full and precise understanding of the same to give a range of percentages within which the several components thus named may be present and to further illustrate the invention by giving at least one specific composition. Such range of percentages and specific compoistions are given in the following tables:

*Composition range*

I. The matrix:
Percent by weight
Silicon dioxide_____
_____From about 30% to about 65%
"Modifying" material_____
_____From about 2% to about 15%
II. The oxidizer_____
____From an effective amt. to about 25%
III. The deoxidizer_____
_____From about 5% to about 25%

*Specific composition*
Percent
I. (a) Silica sand_____57
(b) Cryolite_____10
II. Oxides of maganese_____16
III. Silico manganese_____17

The weld rod or electrode used may be any conventional fusible weld rod of any conventional composition or size. As previously indicated, the parent metal may be of any conventional ferrous composition.

After the completion of the welding operation, an inspection of the flux layer will show that only a part of the same has been fused. The part which has been fused is a substantially vitreous mass, generally adhering lightly to the welded part. The unfused mass may be collected and used over again. The part which has been fused will upon analysis, however, be found to be so contaminated by having absorbed detrimental materials in cleaning up the weld metal that it may not be used over again.

While I have indicated that my improved process comprises the utilization of a bare electrode, nevertheless, the material previously mentioned and the use of which characterizes my process will also be found of utility in cases where (a) a coated fusible weld rod is used, (b) a combination of a plurality of fusible weld rods arranged in sequence along the line to be welded are employed, and (c) in cases where a plurality of arcing electrodes, only certain of which are fusible, are employed in sequence along the line being welded. Representative illustrations of processes contemplated under (b) and (c) above are given in co-pending application of George G. Landis and L. Keever Stringham, Serial No. 399,984, filed June 27, 1941, which issued June 1, 1943, as U. S. Patent No. 2,320,824.

Throughout the foregoing description I have referred to the use of my improved flux, in the arc welding process of my invention, in layers thicker than the distance between the end of the electrode and the work. By such statements, it is meant that the arc generally occurs below the normal physical level of the flux layer, this being generally referred to as the process utilizing a "submerged" arc.

The flux composition of my invention, however, will be found to have utility in both the open and submerged arc, that is, it will be useful in processes whereby the thickness of the deposited layer and other factors in connection with the arc welding operation are such as to result in the maintenance of an open arc.

Other modes of applying the principle of the invention may be employed, change being made as regards the details described, provided the features stated in any of the following claims, or the equivalent of such, be employed.

I, therefore, particularly point out and distinctly claim as my invention:

1. An unfused flux for use in arc welding comprising:

Silica sand_____From about 30% to about 65%
Cryolite_____From about 2% to about 15%
Oxide of manganese_____
_____From about 10% to about 25%
Silico manganese__From about 10% to about 25%

2. A flux for arc welding consisting principally of an unfused mixture of silica sand in predominant amount and smaller amounts of a fluoride, a metallic oxide capable of acting as an oxidizer at arc welding temperatures, and a deoxidizer selected from the class consisting of silico manganese, ferro manganese and ferro silicon.

3. A flux for arc welding consisting principally of an unfused mixture of silica sand in predominant amount and smaller amounts of cryolite, manganese oxide and silico manganese.

VLADIMIR PETERS.